(12) United States Patent  
Minh

(10) Patent No.: US 7,983,845 B2  
(45) Date of Patent: Jul. 19, 2011

(54) METHOD AND SYSTEM FOR ANALYZING A LAMINATED SAND/SHALE FORMATION

(75) Inventor: Chanh Cao Minh, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 557 days.

(21) Appl. No.: 12/120,920

(22) Filed: May 15, 2008

(65) Prior Publication Data

US 2009/0287416 A1 Nov. 19, 2009

(51) Int. Cl.
*G01V 3/38* (2006.01)
(52) U.S. Cl. .......................................................... 702/7
(58) Field of Classification Search .................. 702/7
See application file for complete search history.

(56) References Cited

U.S. PATENT DOCUMENTS

| 3,500,683 A | 3/1970 | Hoyle |
| 5,550,473 A | 8/1996 | Klein |
| 2005/0114029 A1 | 5/2005 | Clavaud et al. |

FOREIGN PATENT DOCUMENTS

WO WO0039612 7/2000

OTHER PUBLICATIONS

Kenneth Heslop, Interpretation of Shaly Sands, Apr. 8, 2003, pp. 1-15).*
Minh, Cao C. et al., NMR Petrophysics in Thin Sand-Shale Laminations, SPE 102435, SPE Annual Technical Conference and Exhibition, San Antonio, Texas, 2006.
Clavaud, J.B. et al., Field Example of Enhanced Hydrocarbon Estimation in Thinly Laminated Formation with a Triaxial Array Induction Tool: a Laminated Sand-Shale Analysis with Anistropic Shale, SPWLA Annual Logging Symposium, New Orleans, LA, 2005.
Fanini, O. et al., Enhanced, Low-Resistivity Pay, Reservoir Exploration and Delineation with the Latest Multicomponent Induction Technology Integrated with NMR, Nuclear and Borehole Image Measurements, SPE 69447, SPE Latin American and Caribbean Petroleum Engineering Conference, Buenos Aires, Argentina, 2001.
Klein, J.D. et al., The Petrophysics of Electrically Anisotropic Reservoirs, The Log Analyst, vol. 38, No. 3, May-Jun. 1997 Issue.
Shray, F. et al., Evaluation of Laminated Formations Using Nuclear Magnetic Resonance and Resistivity Anisotropy Measurements, SPE 72370, SPE Eastern Regional Meeting, Canton, Ohio, 2001.
Minh, Chanh Cao et al., Formation Evaluation in Thin Sand/Shale Laminations, SPE 109848, Anaheim, California, Nov. 11-14, 2007.
Pritchard, Tim et al., The Quantification of Hydrocarbon Reserves in Thinly Laminated Shaly-Sandstone Formations, SPE 81077, Port-of-Spain, Trinidad, West Indies, Apr. 27-30, 2003.

* cited by examiner

*Primary Examiner* — Tung S Lau
(74) *Attorney, Agent, or Firm* — Darla Fonseca; Charlotte Rutherford

(57) ABSTRACT

A method for analyzing a formation, that includes plotting resistivity data points on a resistivity graph to obtain plotted resistivity data points, and selecting a first shale point on the resistivity graph based on the plotted resistivity data points. The first shale point represents a resistivity anisotropy of shale in the formation. The method further includes generating, for each of a plurality of shale fraction values, a first shale fraction curve on the resistivity graph based on the shale fraction value and the first shale point, and generating, for each of a plurality of sand resistivity values, a first sand resistivity curve on the resistivity graph based on the sand resistivity value and the first shale point. A hydrocarbon yielding region in the formation is identified based on the first sand resistivity curves and the first shale fraction curves.

9 Claims, 10 Drawing Sheets

METHOD AND SYSTEM FOR ANALYZING A LAMINATED SAND/SHALE FORMATION

BACKGROUND

Identification of regions in a formation that contain hydrocarbons is the primary goal of oil and gas exploration. The hydrocarbon containing regions are often referred to as pay regions of the formation. One way to identify the pay regions is based on the resistivity of the formation at different depths.

Formation resistivity may be measured with electrodes (laterologs) or antennas (induction logs) that can transmit a current or electromagnetic (EM) energy into earth formations. The energy transmitted into the formations interacts with the conductive media in the formations. With laterologs, a current (or voltage) is injected into the formation using a first pair of electrodes. A second pair of electrodes is typically placed at a distance from the first pair of electrodes to measure the voltage drop or current flow between the second pair of electrodes. The measured voltage drop or current flow may be used to derive the resistivity (or its inverse, conductivity) of the formation. In this description, resistivity is intended to include its inverse, conductivity, and vice versa, because embodiments of the invention are equally applicable to resistivity or conductivity.

With induction logging, EM energy is transmitted into a formation to induce eddy currents in the formation. The eddy currents flow in loops that lie on planes perpendicular to the magnetic dipole of the transmitting antenna. The magnitudes of the eddy currents depend on the conductivities of the formation. The eddy currents in turn induce secondary magnetic fields, the magnitudes of which depend on the magnitudes of the eddy currents. Therefore, by measuring the magnitudes of the secondary magnetic fields (using a receiver antenna), it is possible to indirectly determine the resistivity of the formation around the transmitter and receiver antennas.

Resistivities of formations depend on the amounts and types of fluids included in the pores therein. Thus, different formations may have different resistivities due to different porosities, and/or different amounts or types of fluids included therein. When the formation is homogeneous, the electric property (resistivity or its inverse, conductivity) is constant regardless of the direction of the measurements. However, earth formations often include sedimentation layers that may have different geophysical properties (e.g., grain sizes, porosities, etc.), and hence different electrical properties. For example, the resistivity of shale may be different in different directions. Thus, the formation may have a resistivity property that differs in different directions. This phenomenon is referred to as formation (electrical) anisotropy.

In a typical situation, a borehole may be drilled through multiple sedimentation layers in a direction perpendicular to the layers, i.e., a vertical well. In a vertical well, a resistivity measurement along a direction parallel the borehole axis is referred to as a vertical resistivity because the measurement is made in a direction perpendicular to the sedimentation layers. In the vertical resistivity measurements, the current paths run through various sedimentation layers, which act like different resistors connected in a series.

FIG. 1 shows an example model of a formation (10) with a borehole (12). As shown in FIG. 1, the formation (10) may have multiple layers of shale (14) and sand (18). The shale (14) in the formation has an anisotropic resistivity property. Specifically, as shown by the shale resistivity values (16), the vertical resistivity of the shale ($R_{shale-v}$) in the example formation (10) is 2 ohms meter ($\Omega \cdot m$) while the horizontal resistivity of the shale ($R_{shale-h}$) is 1 $\Omega \cdot m$. In contrast, the sand (18) in the formation (10) has an isotropic resistivity property. In the example, the resistivity of the sand ($R_{sand}$) in both the horizontal direction and the vertical direction is 20 $\Omega \cdot m$ as shown by the sand resistivity values (20). The shale fraction is 0.4 while the sand fraction is 0.6 as shown by the shale and sand fraction values (22).

Continuing with FIG. 1, the formation (10) exhibits anisotropic resistivity property because of the shale anisotropy and the sand and shale fraction values (24). In particular, the vertical resistivity ($R_V$) in the example formation (10) is 12.8 $\Omega \cdot m$ while the horizontal resistivity ($R_H$) is 2.3 $\Omega \cdot m$. By identifying the horizontal and the vertical resistivity, the pay (i.e., hydrocarbon yielding) region and the non-pay regions of the formation (10) may be identified.

Over the years, most of the homogeneous or thick-layer oil and gas reservoirs have been discovered. As a result, many reservoirs comprise thin layers of pay regions. With technology advances such as directional and horizontal drilling, it is becoming economical to produce in thin reservoirs that traditionally would have been ignored. The industry has also begun to realize the importance of thinly laminated reservoirs that have been by-passed due to low apparent resistivity in vertical wells. Therefore, a need exists for methods that can accurately identify the pay regions of the formation.

SUMMARY

In general, in one aspect, the invention relates to a method for analyzing a formation, that includes plotting resistivity data points on a resistivity graph to obtain plotted resistivity data points, and selecting a first shale point on the resistivity graph based on the plotted resistivity data points. The first shale point represents a resistivity anisotropy of shale in the formation. The method further includes generating, for each of a plurality of shale fraction values, a first shale fraction curve on the resistivity graph based on the shale fraction value and the first shale point, and generating, for each of a plurality of sand resistivity values, a first sand resistivity curve on the resistivity graph based on the sand resistivity value and the first shale point. A hydrocarbon yielding region in the formation is identified based on the first sand resistivity curves and the first shale fraction curves.

In general, in one aspect, the invention relates to a computer system for analyzing a formation, that includes a processor, a memory, a display, and software instructions stored in the memory. The software instructions enable the computer system to plot resistivity data points on a resistivity graph to obtain plotted resistivity data points. A shale point is selected on the resistivity graph based on the plotted resistivity data points. The first shale point represents a resistivity anisotropy of shale in the formation. The software instructions further enable the computer system to generate, for each of a plurality of shale fraction values, a first shale fraction curve on the resistivity graph based on the shale fraction value and the first shale point, generate, for each of a plurality of sand resistivity values, a first sand resistivity curve on the resistivity graph based on the sand resistivity value and the first shale point, and display the display the resistivity graph with the sand resistivity curves and the shale fraction curves on the display. A hydrocarbon yielding region in the formation is identified based on the first sand resistivity curves and the first shale fraction curves.

In general, in one aspect, the invention relates to a computer readable medium that includes computer readable program code embodied therein for causing a computer system to plot resistivity data points on a resistivity graph to obtain plotted resistivity data points. The resistivity data points are defined for a formation. A shale point represents a resistivity anisotropy of shale in the formation and is selected on the resistivity graph based on plotted resistivity data points. The computer readable program code further causes the computer system to generate, for each of a plurality of shale fraction values, a shale fraction curve on the resistivity graph based on the shale fraction value and the shale point, generate, for each of a plurality of sand resistivity values, a sand resistivity curve on the resistivity graph based on the sand resistivity value and the shale point, and display the resistivity graph with the sand resistivity curves and the shale fraction curves. A hydrocarbon yielding region in the formation is identified based on the displayed resistivity graph with the sand resistivity curves and the shale fraction curves.

Other aspects of the invention will be apparent from the following description and the appended claims.

DETAILED DESCRIPTION

Figure 1:
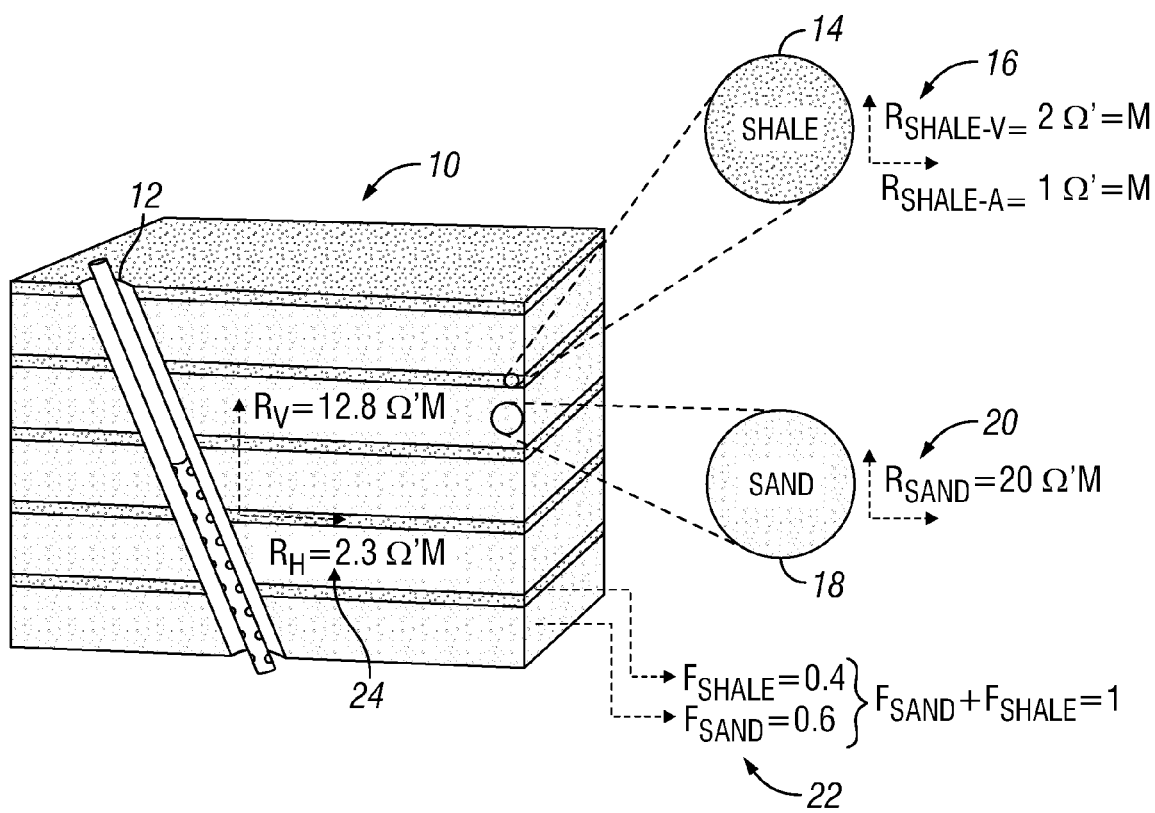
FIG. 1 shows an example model of a formation.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for identifying hydrocarbon yielding regions of a formation. Specifically, embodiments of the invention allow the user to analyze formation data by creating a dynamic resistivity graph for the formation data. The resistivity graph presents a cross plot of vertical resistivity and horizontal resistivity of the formation.

Resistivity data points are plotted on the resistivity graph to present the formation data to the user. Each plotted resistivity data point represents a vertical resistivity and a horizontal resistivity at a specific location or depth in the formation. By viewing the plotted resistivity data points, the user may determine a shale point. The shale point defines the vertical resistivity and horizontal resistivity of the shale in the formation. By accounting for the vertical resistivity and horizontal resistivity of the shale, an accurate identification of hydrocarbon yielding regions of the formation may be made.

In order to identify the hydrocarbon yielding region, shale fraction curves and sand resistivity curves are generated from resistivity equations using the user-selected shale point. Specifically, a separate shale fraction curve is generated for each different value of shale fraction based on the shale point. Similarly, a separate sand resistivity curve is generated for each different value of sand resistivity based on the shale point. The generated shale fraction curves and sand resistivity curves are displayed for the user. The curves plotted on the resistivity graph provides a graphical representation of the forward model equations of vertical resistivity ($R_v$) and horizontal resistivity ($R_h$).

Because the resistivity graph represents the resistivity equations, a user can determine whether the curves from the resistivity equations are consistent with the plotted resistivity data points and easily analyze the formation. For example, the user may determine whether the shale point is correctly selected based on the position of the plotted data points with respect to the shale fraction curves and the sand resistivity curves. If the shale point is incorrectly selected, then the user may select a new shale point to generate different shale fraction and sand resistivity curves. Thus, the resistivity graph is dynamic as new shale fraction and sand resistivity curves may be generated by the selection of a new shale point.

Further, from the resistivity graph, the user may quickly identify the regions of the formation that are likely to produce hydrocarbons by reading off the graph the values of $R_{sand}$ and $F_{shale}$ for each data point of $R_v$, $R_h$. High values of $R_{sand}$ with respect to the wet sand resistivity indicate hydrocarbons. Thus, the resistivity graph allows a user to analyze the formation data to identify the hydrocarbon yielding regions of the formation without solving for $R_{sand}$ and $F_{shale}$.

Figure 2:
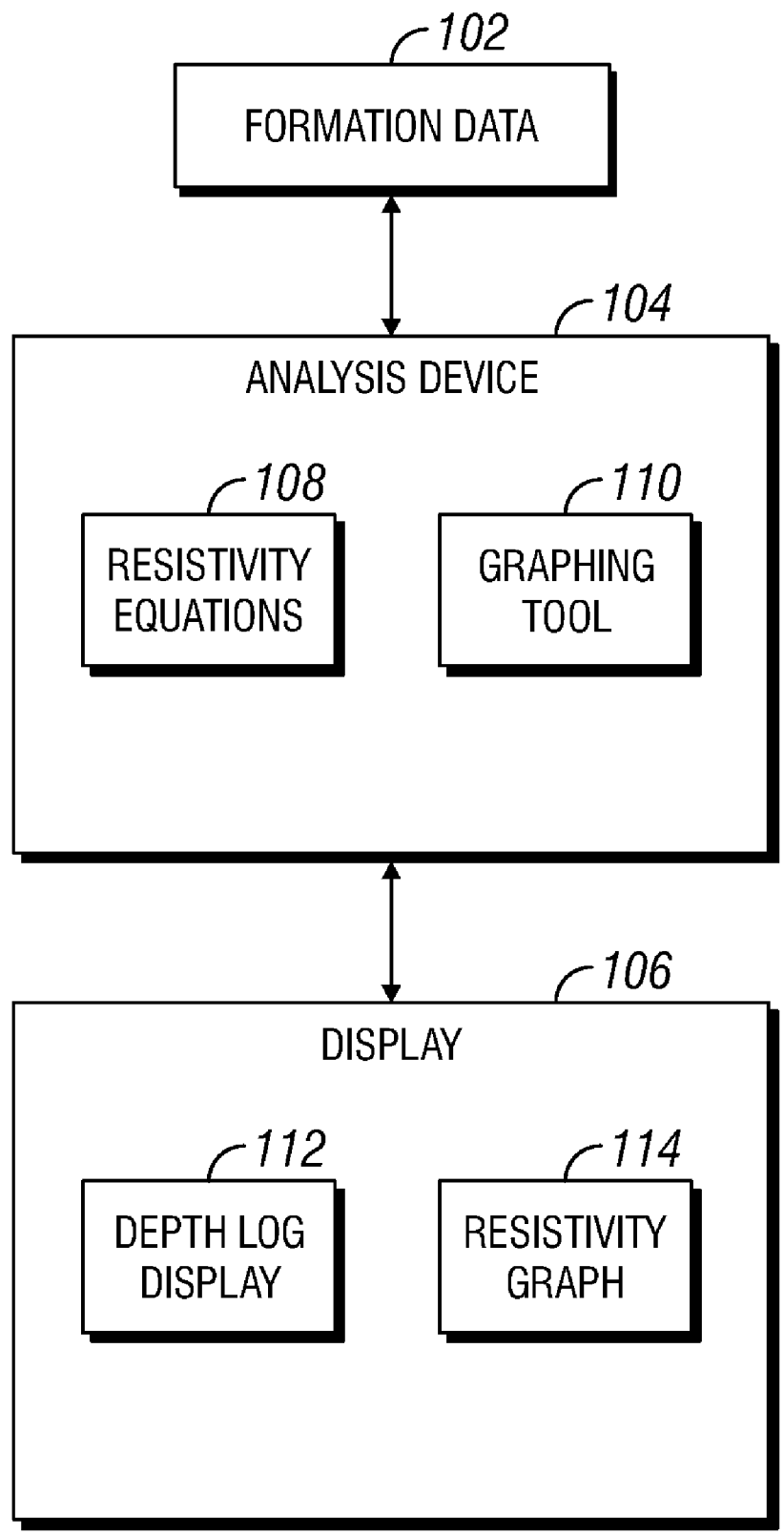
FIG. 2 shows a schematic diagram of a system in accordance with one or more embodiments of the invention.

FIG. 2 shows a schematic diagram of a system in accordance with one or more embodiments of the invention. As shown in FIG. 2, the system includes a formation data repository (102), an analysis device (104), and a display (106). Each of these components is described below.

In one or more embodiments of the invention, the formation data repository (102) is any type of storage unit and/or device (e.g., a file system, database, collection of tables, or any other storage mechanism) for storing formation data. The formation data repository (102) may include multiple different storage units and/or devices. The multiple different storage units and/or devices may or may not be of the same type or located at the same physical site. For example, a portion of the formation data repository (102) may be stored on an application server while another portion is distributed across the Internet. In one or more embodiments of the invention, the formation data repository (102), or a portion thereof, is secure.

In one or more embodiments of the invention, formation data in the formation data repository is data from a geological formation. The formation data may include data collected from the formation using one or more sensors (not shown). The formation data may also include calculated data. The calculated data may be derived or interpolated from the data collected from the sensors.

The formation data may include resistivity data points, shale fraction data, water saturation data, gamma ray data, and other such data. In one or more embodiments of the invention, the resistivity data points define values for the vertical and horizontal resistivity at different depths in the formation. The shale fraction data identifies the percentage of shale in the formation. The shale may be laminated shale. The gamma ray data identifies the gamma ray emission from the formation. The water saturation data identifies the percentage of water in the formation. Each of the different types of formation data may be gathered at or calculated for different depths in the formation. Thus, the formation data may ideally provide a comprehensive view of the formation.

Continuing with FIG. 2, an analysis device (104) includes functionality to analyze a formation in accordance with one or more embodiments of the invention. Specifically, the analysis device (104) includes functionality to obtain formation data from the formation data repository (102) and assist the user in analyzing the formation data. In one or more embodiments of the invention, the analysis device includes resistivity equations (108) and a graphing tool (110). The resistivity equations (108) and graphing tool (110) are discussed below.

Resistivity equations (108) define the resistivity in the formation. In one or more embodiments of the invention, the resistivity equations identify the vertical resistivity ($R_V$) and horizontal resistivity ($R_H$) as a function of one or more of the following parameters: sand resistivity ($R_{sand}$), vertical shale resistivity ($R_{shale-v}$), horizontal shale resistivity ($R_{shale-h}$), shale fraction ($F_{shale}$), and sand fraction ($F_{sand}$).

The following is an example equation for calculating the vertical resistivity of the formation as a function of the sand fraction, shale fraction, resistivity of the sand and vertical resistivity of the shale:

$$R_V = F_{sand} \cdot R_{sand} + F_{shale} \cdot R_{shale-v} \quad \text{(Equation 1)}$$

The following example equation may be used to calculate the horizontal resistivity of the formation as a function of the sand fraction, shale fraction, resistivity of the sand and horizontal resistivity of the shale:

$$\frac{1}{R_H} = \frac{F_{sand}}{R_{sand}} + \frac{F_{shale}}{R_{shale-h}} \quad \text{(Equation 2)}$$

The following example equation relates the value of the sand fraction and the shale fraction:

$$1 = F_{sand} + F_{shale} \quad \text{(Equation 3)}$$

The above equations are used in conjunction with a shale point to generate shale fraction curves and sand resistivity curves. A shale point defines the values for both $R_{shale-v}$ and $R_{shale-h}$. The shale point is typically defined by a user viewing the resistivity graph (114) (discussed below). After defining $R_{shale-v}$ and $R_{shale-h}$, $R_{shale-v}$ and $R_{shale-h}$ may be treated as constants when used to create the aforementioned curves. However, as discussed below, if a decision is made to change the shale point, then a new $R_{shale-v}$ and/or a new $R_{shale-h}$ may be defined to create a new set of curves. Further, because $1 = F_{sand} + F_{shale}$ by equation 3, then $F_{sand} = 1 - F_{shale}$. Therefore, example equation 1 may be changed to:

$$R_V = (1 - F_{shale}) \cdot R_{sand} + F_{shale} \cdot R_{shale-v} \quad \text{(Equation 4)}$$

Similarly, example equation 2 may be changed to:

$$\frac{1}{R_H} = \frac{1 - F_{shale}}{R_{sand}} + \frac{F_{shale}}{R_{shale-h}} \quad \text{(Equation 5)}$$

As shown by equation 4 and equation 5, once the values for $R_{shale-v}$ and $R_{shale-h}$ are known, $F_{shale}$ and $R_{sand}$ are the variables needed to calculate $R_V$ and $R_H$. These variables are defined in the shale fraction curves and the sand resistivity curves as discussed below. Thus, by varying $F_{shale}$ and $R_{sand}$ in typical step values, computing the corresponding $R_v$ and $R_h$, and plotting them, a dynamic overlay of $F_{shale}$ and $R_{sand}$ family of curves can be built. This is the graphical representation of equations 4 and 5.

Those skilled in the art will appreciate that the above equations are only intended for explanatory purposes and not intended to limit the scope of the invention. Specifically, different equations may be used that have different formats and/or different parameters. The equations that are used may or may not be mathematically equivalent to the equations discussed above. For example, the equations may be defined in terms of the conductivity of the shale and/or formation.

The graphing tool (110) of the analysis device (104) allows a user to interact with the formation data (102). Specifically, the graphing tool includes functionality to generate a resistivity graph (114) (discussed below) that shows the formation data (102), receive the shale point from a user, and present a resistivity graph (114) with the sand resistivity curves and shale fraction curves to the user.

In one or more embodiments of the invention, the graphing tool (110) includes a graphical user interface (GUI) for interacting with the user. The GUI includes functionality to detect commands from a user and update the resistivity graph (114) accordingly. For example, in one or more embodiments of the invention, the GUI includes functionality to receive a selection of a point on the resistivity graph (114) and update the resistivity graph (114) based on the selection. Further, in one or more embodiments of the invention, the GUI may include various user interface components, such as buttons, checkboxes, drop-down menus, etc., to allow the user to analyze the formation data and navigate through the analysis device (104). For example, the user may switch between different views of the formation data, such as the resistivity graph (114), and the depth log display (112). Thus, a user with minimal computer and/or graphing knowledge can analyze the formation data (102) using the graphing tool (110) in accordance with one or more embodiments of the invention.

Continuing with FIG. 2, the display (106) includes functionality to present the formation data to a user. The display may be a printed page, a monitor (e.g., Cathode Ray Tube, Liquid Crystal Display, touch screen monitor, etc), or any other object that is capable of presenting data. In one or more embodiments of the invention, the display may include a depth log display (112) and a resistivity graph (114).

Continuing with FIG. 2, a depth log display (112) may be used to show the properties of the formation at various depths. In one or more embodiments of the invention, the formation data identifying vertical and horizontal resistivity in the formation has a corresponding depth. Thus, once the pay region of the formation is identified using the resistivity graph (114), the corresponding depth in the formation may be identified using the depth log display (112). In one or more embodiments of the invention, the depth log display (112) may include multiple tracks. Each track may be used to present properties of the formation at a variety of depths. Thus, by comparing tracks at the same depths, a user is able to relate the properties of the formation.

A resistivity graph (114) allows the user to visualize the formation data. In one or more embodiments of the invention, the resistivity graph (114) is shown on a Cartesian coordinate system. In the Cartesian coordinate system, one axis of the resistivity graph (114) represents horizontal resistivity ($R_H$) while another axis represents the vertical resistivity ($R_V$). Thus, any point on the resistivity graph in which $R_H$ does not equal $R_V$ identifies the existence of resistivity anisotropy for that value. The resistivity graph (114) may also include a third axis for gamma ray values in the formation. An example resistivity graph is shown in FIG. 3 and discussed below.

Figure 3:
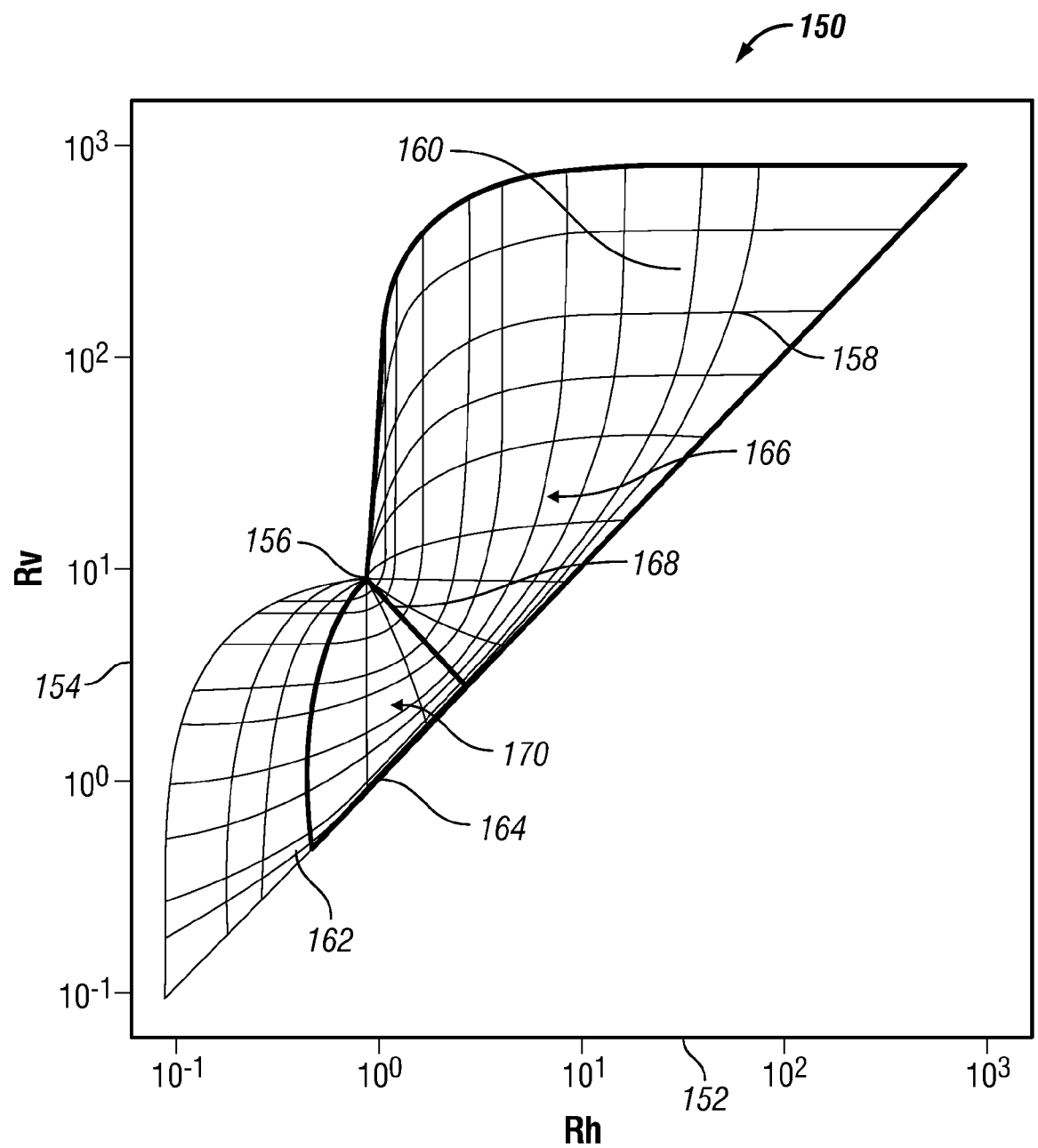
FIG. 3 shows an example resistivity graph in accordance with one or more embodiments of the invention.

FIG. 3 shows an example resistivity graph in accordance with one or more embodiments of the invention. As shown in FIG. 3, the example resistivity graph (150) includes values for $R_H$ on the horizontal axis (152) and values for $R_V$ on the vertical axis (154). The example resistivity graph (150) is shown after the shale point (156) is selected. Specifically, as discussed above, the sand resistivity curves (158) and the shale fraction curves (160) may be generated and shown once the shale point (156) is selected.

The formation isotropy line (164) identifies one of the boundaries for formation data. Specifically, as shown in FIG. 3, the formation isotropy line (164) is a line of points in which $R_H=R_V$. Above and to the left of the formation isotropy line (164) (i.e., the region in which $R_H<R_V$), the formation data, the sand resistivity curves (158), and the shale fraction curves (160) are defined.

The water point (162) corresponds to a point in the formation in which the water saturation is 100%. High water saturation indicates the presence of more water and therefore less potential for hydrocarbons. Conversely, low water saturation indicates a greater potential for hydrocarbons. Similarly, higher anisotropy also indicates the presence of hydrocarbons. Thus, the pay region (166) of the example resistivity graph (150) is an area of the graph that has higher anisotropy and lower water saturation. The pay region (166) corresponds to the hydrocarbon producing region of the formation. In contrast to the pay region (166), the non-pay region (170) corresponds to lower anisotropy and higher water saturation region of the formation. Thus, the non-pay region of the resistivity graph corresponds to a non-pay region of the formation.

A domain boundary line (168) is a line that separates the pay region (166) from the non-pay region (170) of the example resistivity graph (150). The domain boundary line (168) starts at the shale point (156) and extends to the formation isotropy line (164). In one or more embodiments of the invention, the domain boundary line (168) intersects the formation isotropy line (164) at a perpendicular angle. Equation 6, below shows an equation for calculating the domain boundary line.

$$R_V \cdot R_H = R_{shale-v} \cdot R_{shale-h} \quad \text{(Equation 6)}$$

As shown in the example resistivity graph (150) in FIG. 3, by reviewing the resistivity graph, a user is able to identify the pay and non-pay regions of the formation. Although not shown in FIG. 3, the resistivity graph may also include plotted data points. Each plotted data point represents a value for vertical resistivity and a value for horizontal resistivity measured at a specified point in the formation. When the resistivity graph includes the plotted data points, the user may determine whether the shale point is correct based on the sand resistivity curves, shale fraction curves, and the plotted data points. Specifically, each plotted data point or at least a threshold number of plotted data points are within an area defined by the sand resistivity curves and the shale fraction curves when the shale point is correctly selected. Conversely, when the shale point is incorrectly selected, then one or more plotted data points or greater than a threshold number of plotted data points are outside of the region defined by the sand resistivity curves and the shale fraction curves.

Figure 4:
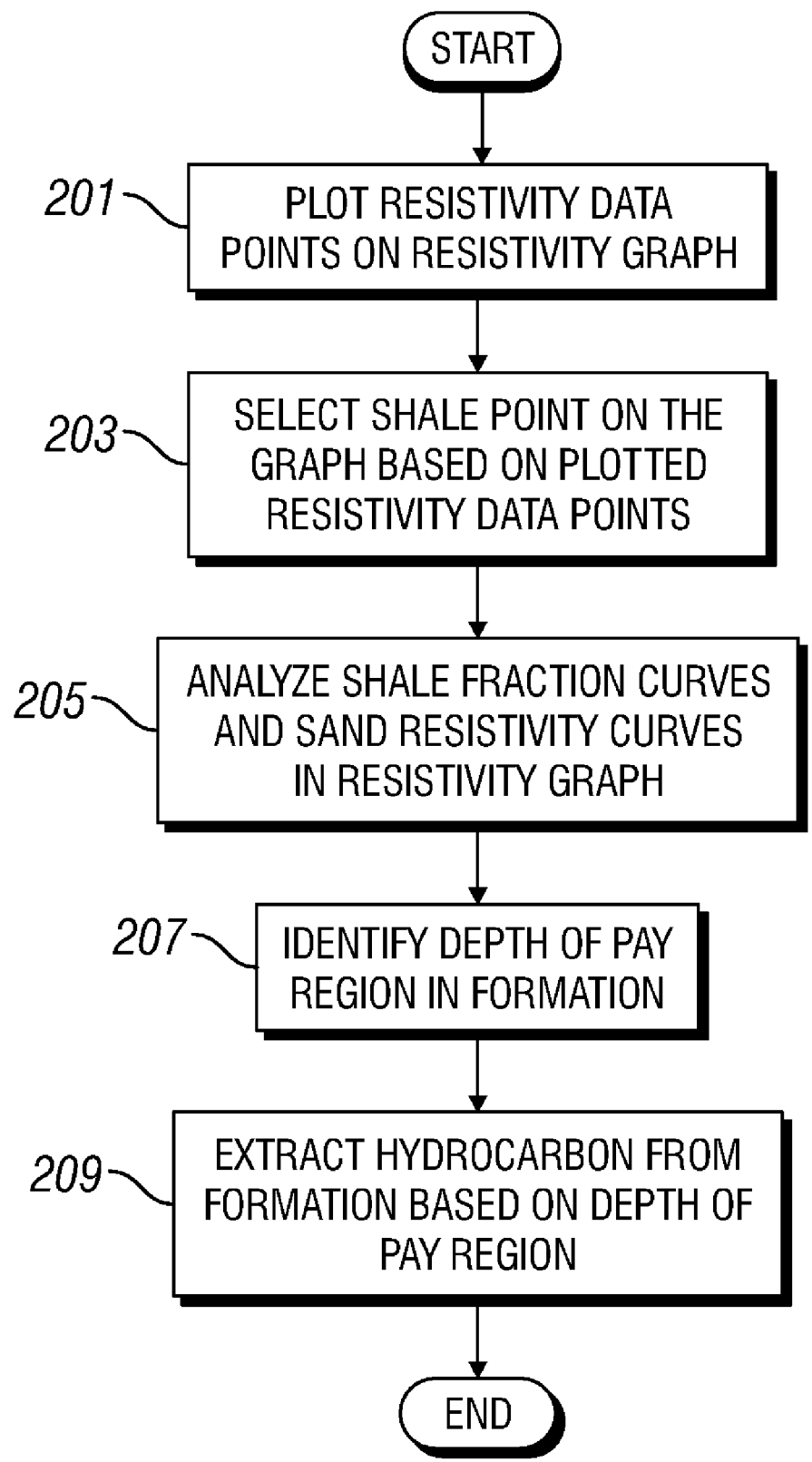
FIGS. 4-5 show flowcharts in accordance with one or more embodiments of the invention.
Figure 5:
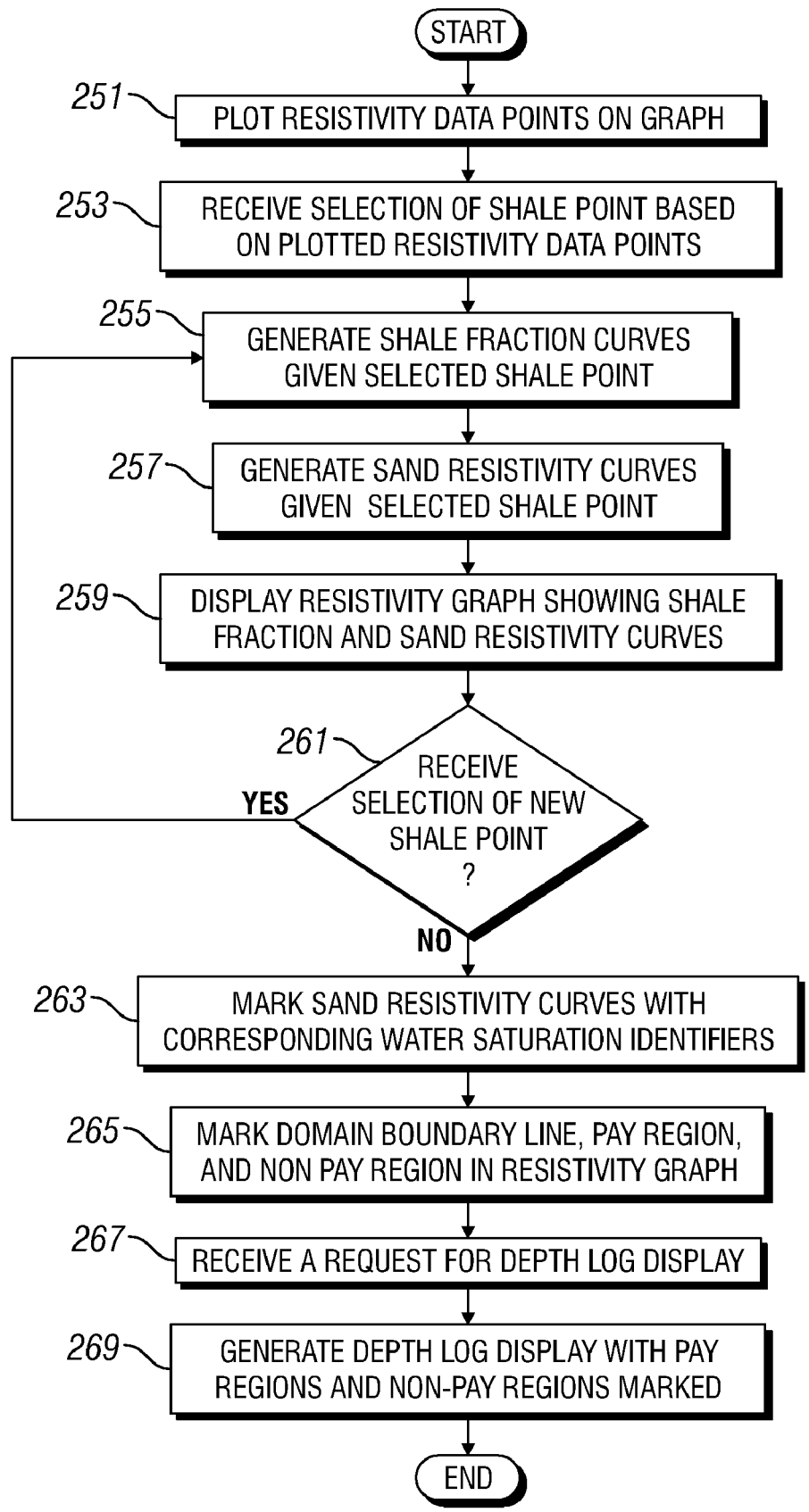

FIGS. 4-5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. In addition, steps such as store and retrieve acknowledgements have been omitted to simplify the presentation.

FIG. 4 shows a flowchart of a method for a user to interact with the resistivity graph in accordance with one or more embodiments of the invention. Resistivity data points are gathered from the formation and stored in the formation data repository. The user may input a command to the analysis device to request a resistivity graph. Resistivity data points are plotted on the resistivity graph (Step 201). The user may specify the location of the resistivity data points in a command to request the resistivity data points are displayed on the graph.

In step 203, based on the plotted resistivity data points, a shale point is selected. In one or more embodiments of the invention, the shale point is selected based on the portion of the resistivity graph having the highest concentration of resistivity data points. An example of how to select the shale point with the highest concentration is discussed below and in FIG. 6A. Alternatively, because shale may emit larger amounts of radiation than surrounding rocks in the formation, the presence of higher gamma ray values on the gamma ray axis may be used to identify the shale point. Thus, an third axis representing the gamma ray values for the formation may be used to identify the shale point. Specifically, a vertical resistivity value with a corresponding horizontal resistivity value that has the highest gamma ray value on the gamma ray axis may be selected as the shale point. An example of how to select the shale point using the gamma ray axis is discussed below and in FIG. 6D.

In one or more embodiments of the invention, the user may position the cursor over the shale point to be selected in the resistivity graph (e.g., by using a mouse, taping on a touch screen, or using any other selection device) and select the shale point directly from the resistivity graph. Alternatively, the user may submit the coordinates of the shale point to be selected.

Based on the selection, the shale fraction curves and the sand resistivity curves are generated and displayed for the user. Accordingly, the user may analyze the shale fraction curves and the sand resistivity curves in Step 205. For example, the user may determine whether the selected shale point is correct. The selected shale point is incorrect when at least one resistivity data point is not within the region defined by the sand resistivity curves or shale fraction curves. The shale point is also incorrect when the resistivity anisotropy of the shale point is too high or too low. One skilled in the art will appreciate that rather considering whether all or none of the resistivity data points are within the region, the determination may be based on threshold numbers. If the shale point is incorrect, then the user may select a new shale point.

The user may also request a depth log display of various data clusters, or concentrations of data. The depth log display may display all of the data clusters together or a portion of the data clusters. In one or more embodiments of the invention, each data cluster is marked in the resistivity graph with a corresponding mark in the depth log display. The marking may be performed by color coding, using boundary markers, distinct types of points (e.g., +, *, and other types of points) and performing other such techniques for emphasizing a region. By using a marking in the depth log display that corresponds to the resistivity graph, the user may identify the depths of each of the clusters in the resistivity graph. In one or more embodiments of the invention, the depth log display may be displayed in a different window from the resistivity graph. Alternatively, the depth log display may be simultaneously viewable with the resistivity graph. For example, the depth log display may be displayed in a different pane of the same window.

Further, in one or more embodiments of the invention, the user may consult, directly from the resistivity graph, the water saturation of a specific point given the resistivity graph's $R_v$ and $R_h$ values. The water saturation values may be displayed automatically on the resistivity graph when the user enters the value of the wet sand resistivity ($R_o$), either from the keyboard or using a pointing device, such as a mouse. The analysis device may plot the water saturation values (SW) using the following equation:

$$S_W = \sqrt{\frac{R_0}{R_{sand}}}$$ (Equation 7)

Using the above equation, the sand resistivity curves can be re-scaled in term of $S_w$. FIGS. 6B and 6D show an example of how the sand resistivity curves are rescaled using the above equation to obtain water saturation values resistivity graph. Specifically, each sand resistivity curve is displayed with the corresponding value for $S_w$.

In one or more embodiments of the invention, from the resistivity graph the user may identify the pay and non-pay region of the resistivity graph. Accordingly, the user may request a depth log display to identify the depths in the formation corresponding to the pay and non pay regions (Step 207).

In step 209, in appropriate circumstances, hydrocarbons may be extracted from the formation based on the depths. For example, the user may provide instructions to the drilling operations that hydrocarbons are available at the specified depth. The drilling operations may then extract the hydrocarbons based on the indicated depth.

FIG. 4 shows a flowchart for analyzing a formation in accordance with one or more embodiments of the invention. Specifically, FIG. 4 shows a flowchart for an application to create the resistivity graph. In step 251, resistivity data points are plotted on the resistivity graph. Specifically, the application identifies the location of the formation data, and gathers the resistivity data points from the location. Further, the application creates a resistivity graph with the data points for the user.

In step 253, the application receives a selection of the shale point based on the plotted resistivity data points. The selection of the shale point may be received by detecting a selection of a pointing device or receiving coordinates from the user with the shale point. Based on the shale point, the shale fraction curves are generated (Step 255). Generating the shale fraction curves may be performed by identifying a set of values for the shale fraction. For example, the set of values may range from zero to one at an interval of 0.05 (i.e., the shale fraction values may be 0.00, 0.05, 0.10, 0.15 . . . 0.85, 0.90, 0.95, 1.00). For each shale fraction value in the set, a shale fraction curve may be generated. In one or more embodiments of the invention, each shale fraction curve is generated using equation 4 and equation 5 above and by varying the sand resistivity value.

In addition to the shale fraction curves, the sand resistivity curves are generated (Step 257). The sand resistivity curves may be generated in a manner similar to generating the shale fraction curves. Specifically, the application may identify a set of values for the sand resistivity. For example, the set of values may range from one tenth to one thousand at an exponential interval (i.e., the sand resistivity values may be 0.10, 0.20, 0.30, 0.50, 1, 2, 5, 10, 20, 50, 100, 200, 500, 1000). For each sand resistivity value in the set, a sand resistivity curve may be generated. In one or more embodiments of the invention, each sand resistivity curve is generated using equation 4 and equation 5 above and by varying the shale fraction value.

In step 259, the sand resistivity curves and the shale fraction curves are displayed. At this stage, the user may view the curves and analyze the formation. For example, the application may receive a selection to switch between different views of the formation data. While displaying the different views of the formation data, a determination may be made whether a selection of a new shale point is received (Step 261). If a selection of a new shale point is received, then the shale fraction curves and the sand resistivity curves are generated for the new shale point and displayed.

In step 263, the sand resistivity curves are marked with the corresponding water saturation identifiers. In one or more embodiments of the invention, the water saturation is derived from the value associated with each sand resistivity curve and Archie equations.

In step 265, the data boundaries, pay region, and non-pay region may be marked on the resistivity graph. The areas may be marked automatically, such as after the curves are generated, or upon request of the user.

In step 267, a request for a depth log display is received. The user may request different types of depth logs to be displayed in the request. For example, the user may request a shale fraction depth log, a density neutron depth log, a depth log that relates the vertical and horizontal resistivity of the formation with the horizontal and vertical resistivity of the shale, a depth log that devices the anisotropy, a water saturation depth log, and other such depth logs.

Accordingly, the depth logs are generated (Step 269). In one or more embodiments of the invention, the depth log is displayed with the pay and non-pay regions of the formation marked. Thus, a user looking at the depth log may predict the depth in the formation that has the greatest amount of hydrocarbons.

FIGS. 6A-6D show an example in accordance with one or more embodiments of the invention. FIGS. 6A-6D are for explanatory uses only and not intended to limit the scope of the invention. For the following example, consider the scenario in which a user is attempting to identify where hydrocarbons may be found in a formation. Resistivity data has been gathered from the formation. Accordingly, the user requests a resistivity graph with plotted resistivity data points.

Figure 6A:
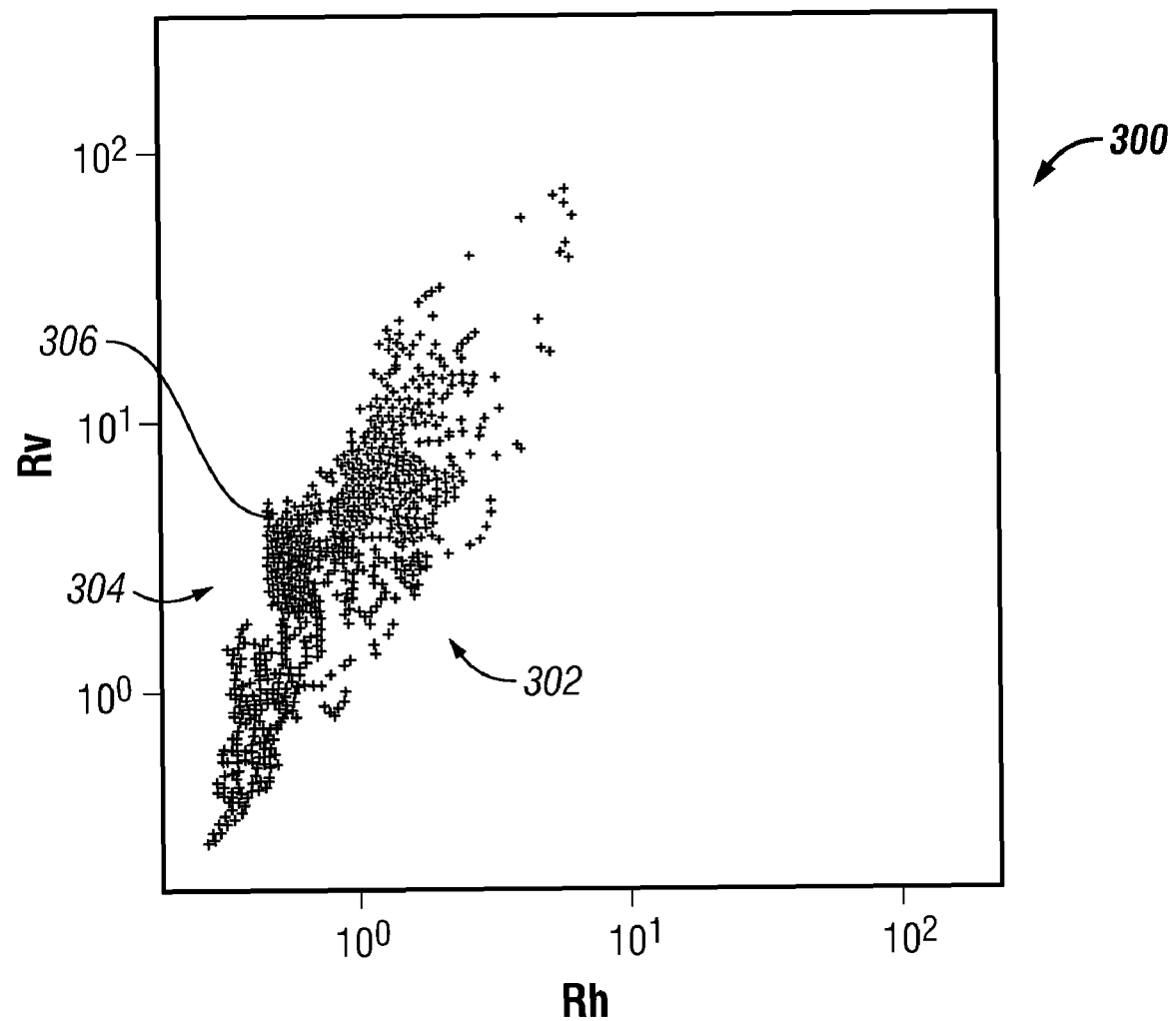
FIGS. 6A-6D show an example in accordance with one or more embodiments of the invention.
Figure 6B:
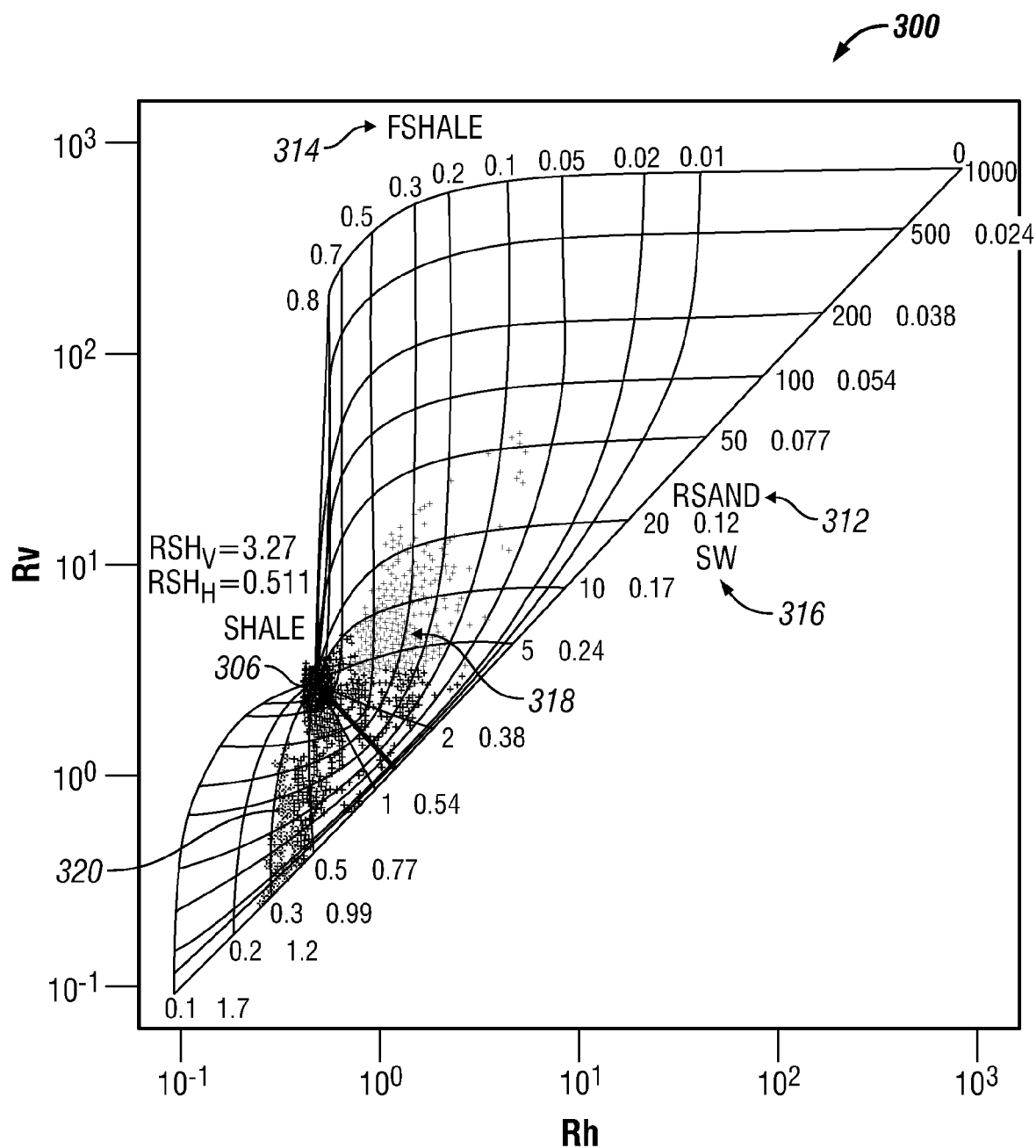

FIG. 6A shows the example resistivity graph (300) with plotted resistivity data points (302). Immediately, the user sees a cluster of resistivity data points (304). The user determines the location of the shale point (306) based on the cluster of resistivity data points (304). Accordingly, the user selects the shale point (306) to generate the sand resistivity curves and the shale fraction curves.

FIG. 6B shows an example resistivity graph (304) showing the sand resistivity curves (312) and the shale fraction curves (314) that were generated based on the shale point (306). As shown in FIG. 6B, the sand resistivity curves (312) and the shale fraction curves (314) may be superimposed over the plotted resistivity data points. Further, the values for water saturation (316) are also displayed for the user. Thus, based on the water saturation, the sand resistivity curves (312), and the shale fraction curves (314), the user may identify the resistivity data points that correspond to the hydrocarbon producing region of the formation and the resistivity data points that correspond to the non-hydrocarbon producing region of the formation. The resistivity data points may be marked in the resistivity graph (300) as pay region (318) and non-pay region (320) for clarification for the user.

Figure 6C:
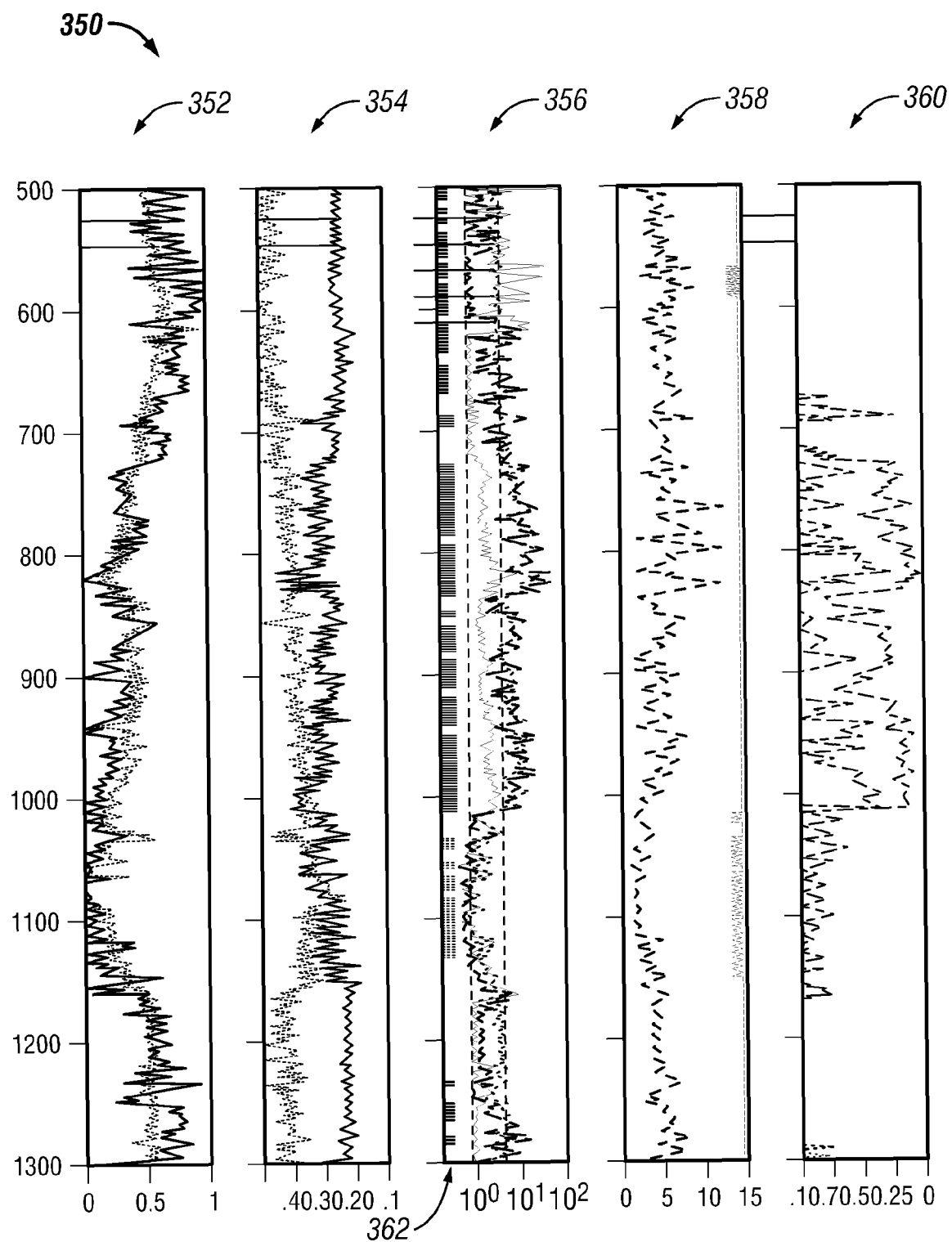
Figure 6D:
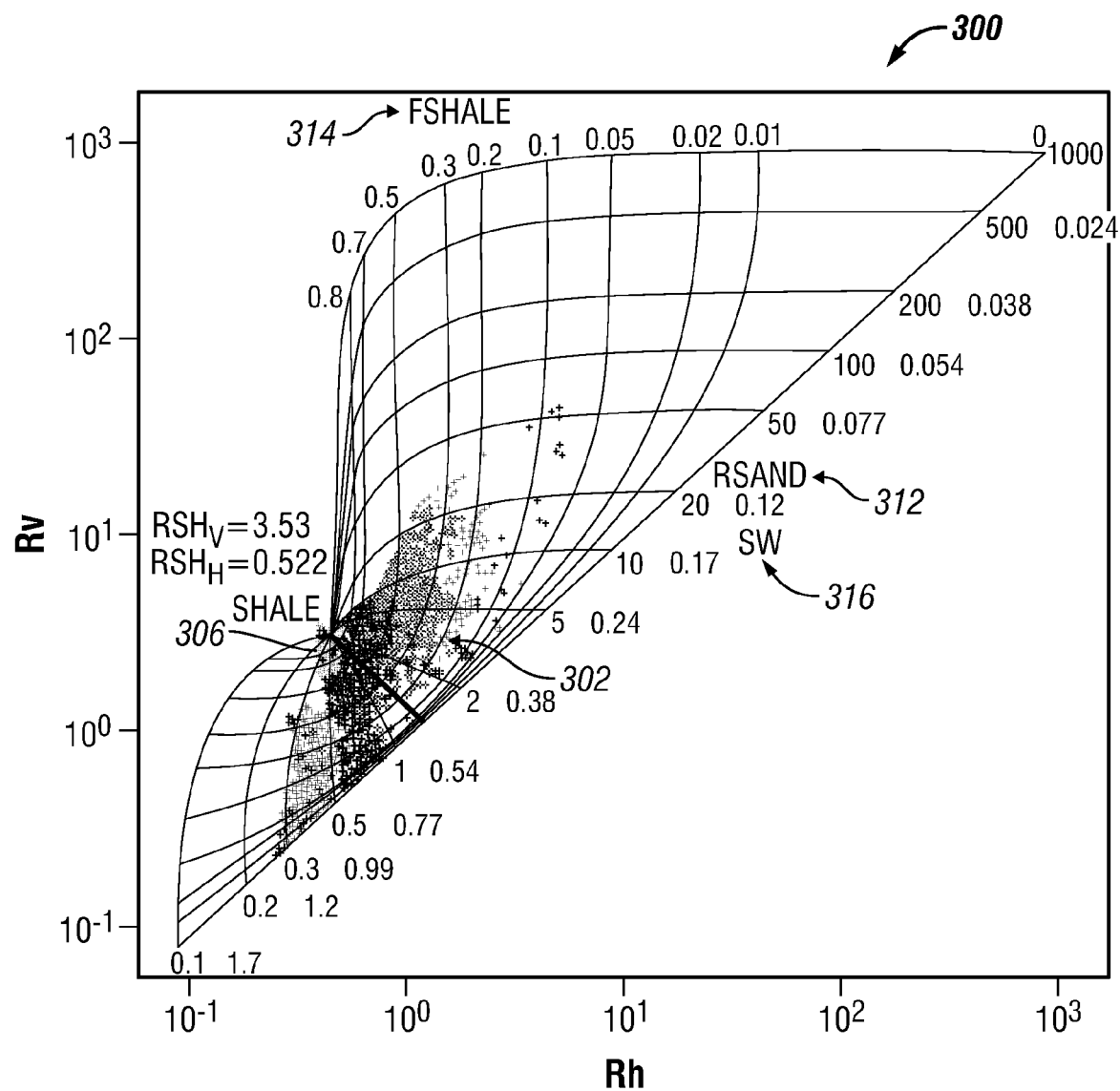

Continuing with the example, the user may further desire to view a depth log display. FIG. 6C shows an example depth log display (350). As shown in FIG. 6C, the depth log display may include multiple tracks, such as a shale fraction track (i.e., track A (352)), a density neutron track (i.e., track B (354)), a track that compares the resistivity of the formation with the resistivity of the shale (i.e., track C (356)), an anisotropy track (i.e., track D (358)), and a water saturation tract (i.e., track E (360)). Each track shows how properties of the formation change at different depths in the formation. Further, track C (356) includes markings (362) corresponding to the resistivity graph in FIG. 6B. The markings (362) identify the pay and non-pay regions of the formation as denoted by the resistivity graph. By comparing the markings from the resistivity graph with the formation properties shown in the different tracks of the depth log display (350), the user may quickly identify the depth to drill to produce hydrocarbons.

FIG. 6D shows the example resistivity graph (300) with plotted resistivity data points (302). As shown in FIG. 6D, each plotted resistivity data point has a corresponding gamma ray value. Based on the gamma ray values, the user may identify the plotted resistivity data point with the highest gamma values. The user determines the location of the shale point (306) based on the resistivity data point with the highest gamma ray value. Accordingly, the user selects the shale point (306) to generate the sand resistivity curves (312) and the shale fraction curves (314).

Figure 7:
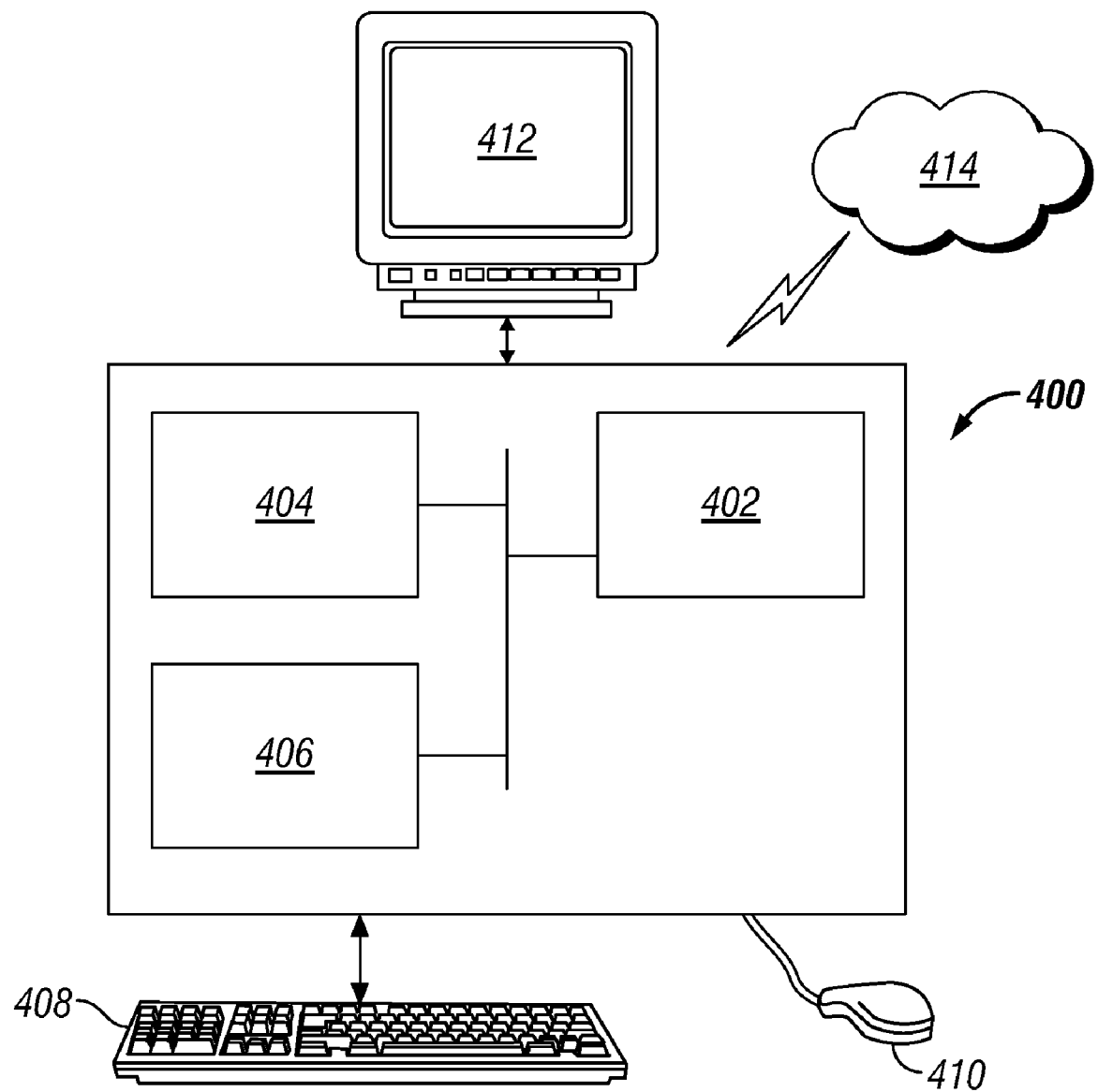
FIG. 7 shows a computer system in accordance with one or more embodiments of the invention.

Embodiments of the invention may be implemented on virtually any type of computer regardless of the platform being used. For example, as shown in FIG. 7, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., display, formation data, analysis device, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing a formation, comprising:
    plotting a plurality of resistivity data points on a resistivity graph of horizontal resistivity with respect to vertical resistivity to obtain a plurality of plotted resistivity data points, the data points obtained by inserting a resistivity measuring instrument into a wellbore drilled through subsurface formations;
    selecting a first shale point on the resistivity graph based on the plurality of plotted resistivity data points, wherein the first shale point represents a resistivity anisotropy of shale in the formation;
    generating, for each of a plurality of shale fraction values, a first shale fraction curve on the resistivity graph based on the shale fraction value and the first shale point;
    generating, for each of a plurality of sand resistivity values, a first sand resistivity curve on the resistivity graph based on the sand resistivity value and the first shale point; and
    identifying a hydrocarbon yielding region in the formation based on the first sand resistivity curves and the first shale fraction curves.

2. The method of claim 1, further comprising:
    displaying the resistivity graph with the first sand resistivity curves and the first shale fraction curves.

3. The method of claim 1, wherein selecting the first shale point comprises:
    identifying a concentration of the plurality of plotted resistivity data points in the resistivity graph, wherein the first shale point is selected based on the concentration.

4. The method of claim 1, wherein the resistivity graph further comprises a gamma ray axis, wherein the first shale point is further selected based on the gamma ray axis.

5. The method of claim 1, wherein identifying the hydrocarbon yielding region comprises:
    identifying a pay region in the resistivity graph based on the first sand resistivity curves, the first shale fraction curves and the first shale point; and
    identifying a depth of the pay region, wherein the hydrocarbon yielding region of the formation is at the depth in the formation.

6. The method of claim 5, wherein identifying the depth of the pay region is performed by viewing a depth log display for the formation, wherein the depth log display maps the pay region to the corresponding depth of the formation.

7. The method of claim 1, wherein a water saturation is displayed for each of the first sand resistivity curves on the resistivity graph.

8. The method of claim 1, further comprising:
    selecting a second shale point on the graph based on the plurality of plotted resistivity data points;
    generating, for each of the plurality of shale fraction values, a second shale fraction curve on the resistivity graph based on the shale fraction value and the second shale point;
    generating, for each of the plurality of sand resistivity values, a second sand resistivity curve on the resistivity graph based on the sand resistivity value and the second shale point; and
    determining that a plotted resistivity data point of the plurality of plotted resistivity data points is outside of a region defined by the second sand resistitivity curves and second shale fraction curves,
    wherein the first shale point is selected based on the determination that the plotted resistivity data point is outside of the region.

9. The method of claim 1, wherein the plurality of resistivity data points are for a laminated shale.

* * * * *